Nov. 4, 1952
W. D. THOMPSON
2,616,342
PLURAL FILM CAMERA WITH FILM STRIPS
AT RIGHT ANGLES TO ONE ANOTHER
Filed July 19, 1947
2 SHEETS—SHEET 1
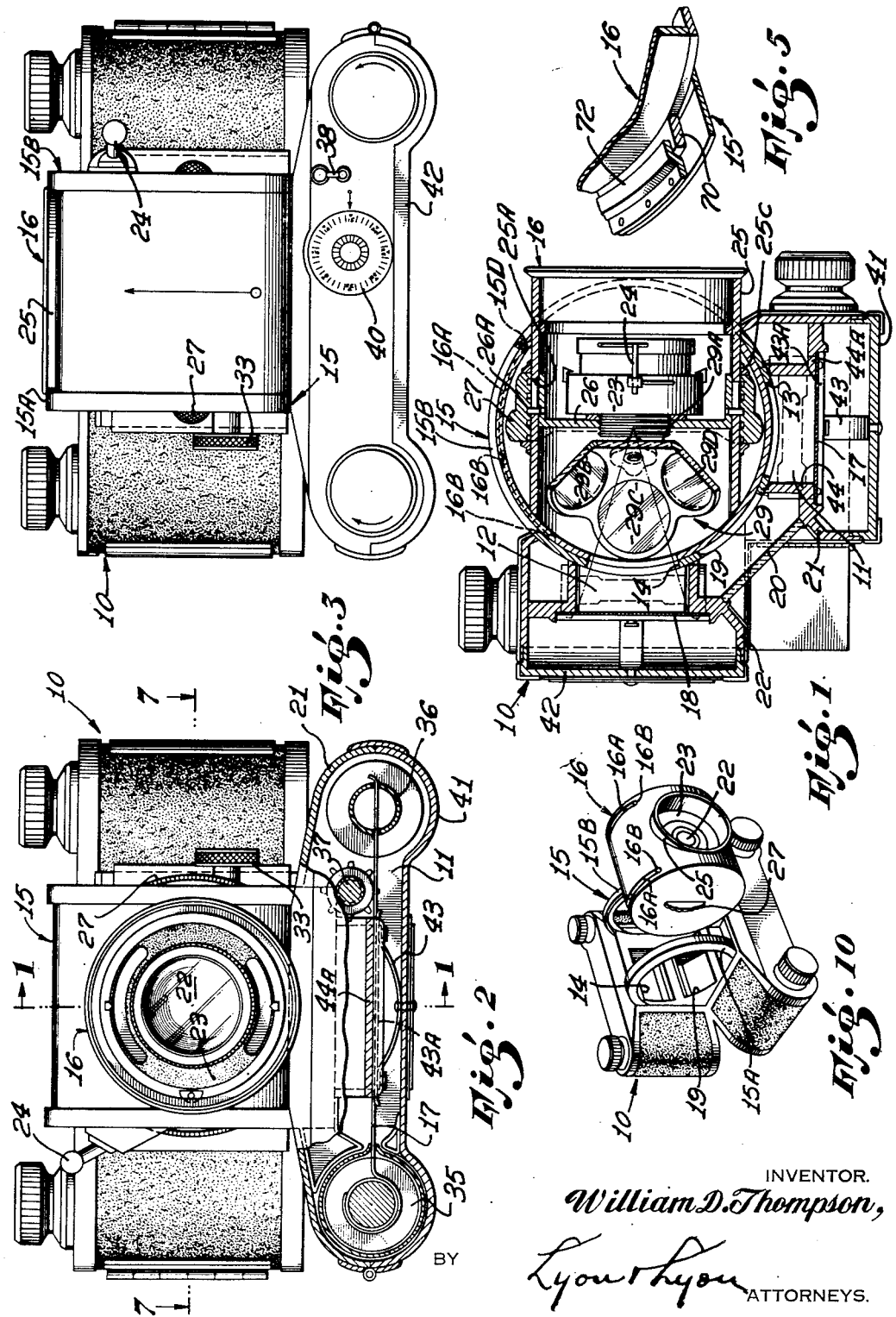
INVENTOR.
William D. Thompson,
BY
Lyon & Lyon
ATTORNEYS.

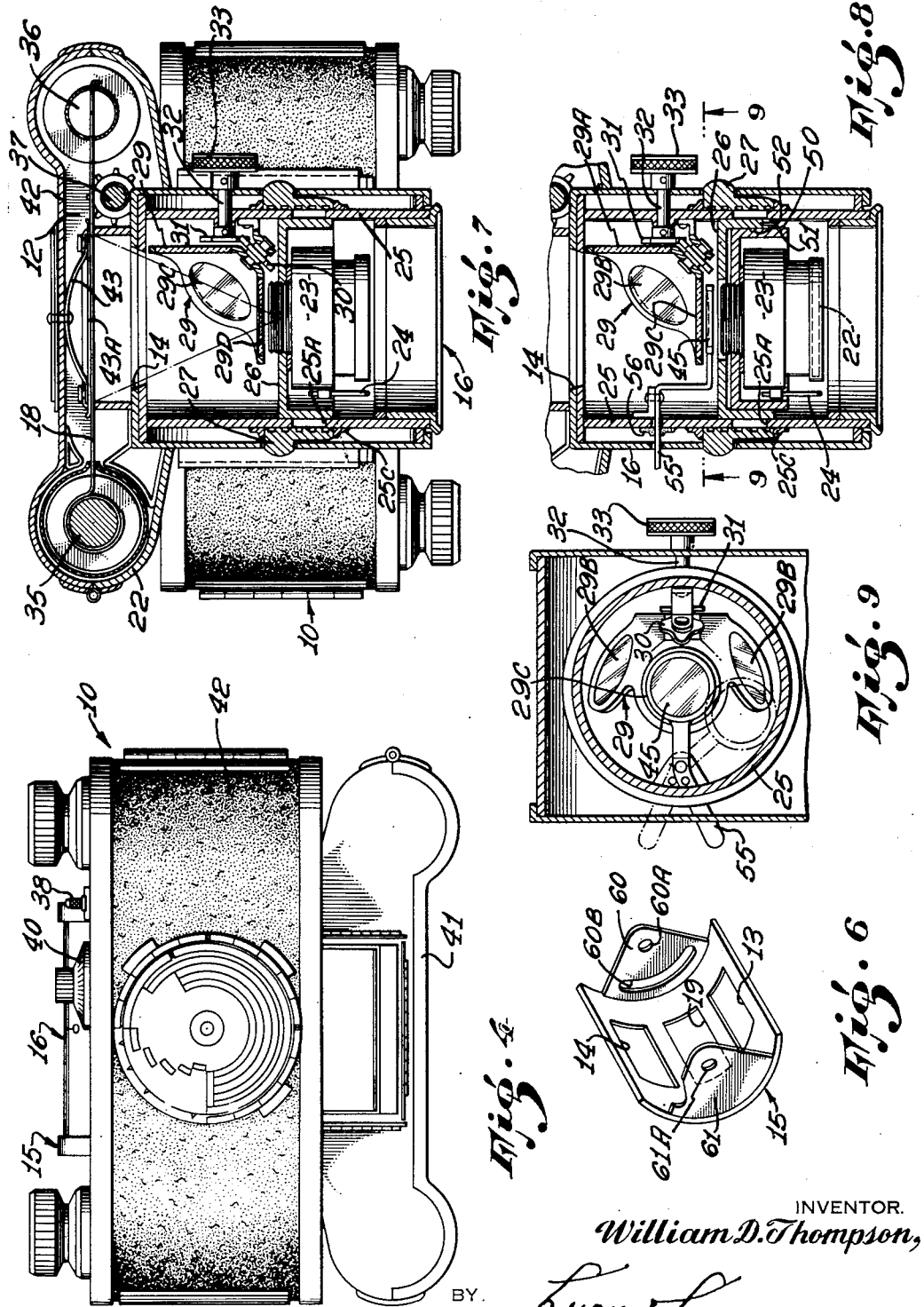

Patented Nov. 4, 1952

2,616,342

UNITED STATES PATENT OFFICE 2,616,342

PLURAL FILM CAMERA WITH FILM STRIPS AT RIGHT ANGLES TO ONE ANOTHER

William D. Thompson, San Diego, Calif.

Application July 19, 1947, Serial No. 762,029

3 Claims. (Cl. 95—11)

The present invention relates generally to a camera which may utilize one or a plurality of films arranged for selective exposure, and as an example and not as a limitation to two film cameras of the type shown in my United States Patent 2,315,284, issued March 30, 1943, on a Multiple Film Carrying Camera.

While certain features of the present invention are specifically related to two film cameras of the type shown therein, other features of the present invention may be present in cameras which are arranged to expose but one film.

An object of the present invention is to provide an improved camera of the type in which a lens system may be selectively positioned for projecting scenes onto either one or two film strips having their planes in quadrature whereby the camera may be loaded with, for example, color film and also black and white film and exposures made on either one of these two films according to the desires of the operator.

Another object of the present invention is to provide an improved camera that incorporates many of the desirable features of the more expensive camera structures shown in my United States Patent 2,315,284, a feature of the present camera being that it is relatively simple and may be made inexpensively from screw machine parts and stampings utilizing present day mass production methods.

Still another object of the present invention is to provide an improved roll film camera having a single optical exposure system adapted upon rotation on the camera case for selective exposure of frames of different types of films having their planes substantially in quadrature.

Yet another object of the present invention is to provide a camera incorporating an improved telephoto system.

Yet another object of the present invention is to provide a camera incorporating improved telephoto lens means which may be selectively rendered operative to take magnified pictures of distant objects and to take pictures without magnification.

A further object of the present invention is to provide a camera having incorporated therein an improved filter structure which may be selectively positioned between the lens system and the film contained in the camera.

There is shown and described herein a unitary compact roll film camera having two individual film compartments which may each contain film of different characteristics with the film arranged in planes at right angles to each other for selective exposure by a single lens system which in accordance with novel features of the present invention is mounted for sliding guided movement in a curved path on the camera case into proper position for exposing either film. Preferably the optical exposure system incorporates therein a view finder which is a ground glass screen intermediate the two film strips to aid in properly focusing the system. Also, the optical exposure system incorporates adjustably positioned filter elements; further, the optical exposure system may include telephoto means all disposed between the lens and the film for projecting a desired image on either film or on the ground glass screen. Because the camera is self-contained, regardless of whether or not the optical exposure system is positioned for exposure of film, there are no separate detachable parts, the camera is comparable in size to a single film camera using the same size film, and may be used after a minimum amount of instruction by persons already familiar with conventional single film roll cameras.

Usually, in adapting a telephoto lens to an ordinary camera, it is necessary to screw out the regular lens, and replace it with a telephoto lens or to use a telephoto attachment that slips or screws onto the front of the camera lens. In accordance with the present invention, new methods and means for accomplishing the same result are provided. One method is to replace one of the filters positionable between the lens system and the film contained in the camera with a negative type or concave lens of proper focal length so that when it is moved or swung into position behind the normal lens incorporated within the camera, a telephoto combination is obtained. The other method is to mount the negative or concave lens element in a sliding or rotatable holder that is immediately in front of the filter element but behind the normal lens of the camera. In the latter case, the negative or concave lens element may be selectively positioned in operative and inoperative position and the normal lens of the camera may be mounted in a telescopic member so that it can be drawn out a distance sufficient to bring the complete assembly substantially into focus; when the negative or concave type of lens element is not positioned for use, the normal camera lens is simply pushed back in its cooperating telescopic member to its proper position for normal operation.

Still a further object of the present invention is to provide an improved camera having a pair of films with their planes at right angles to one another in which a common lens system arranged for exposure of the film is movable in a guided curve path on the camera case to avoid the necessity of detaching, at any time, the lens system from the case and the necessity of providing expensive self-closing light tight gates which are always subject to malfunction.

Yet a further object of the present invention is to provide an improved camera in which may be disposed two film strips of different characteristics with a common optical system which may be moved to expose either film in a minimum amount of time.

Yet a further object of the present invention is to provide an improved camera arranged to have mounted therein different film strips substantially at right angles to one another which lends itself to an attractive design, is easy to operate, does not require removal of the optical exposure system to expose either film strip, allows the different film to be exposed in the shortest possible time, which may be made light tight in an expensive fool-proof manner, and which allows easy loading of the different film strips.

Yet a further object of the present invention is to provide an improved camera which may be loaded with two different types of film strips having their planes substantially in quadrature with an optical exposure system movable in a curved path to positions for exposure of either film strip, a subsidiary feature of this new arrangement being that the optical system in its path of movement between said positions may expose one side of a focusing screen which may comprise a ground glass or acid etched glass focusing screen.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 shows a longitudinal sectional view through a camera structure embodying the present invention taken substantially on the line 1—1 of Figure 2.

Figure 2 is a view in front elevation of a camera structure embodying the present invention with a portion of one of the film compartments fragmented to show some of its internal structure.

Figure 3 is a view in plan elevation of the camera shown in Figure 2.

Figure 4 is a view in rear elevation of the camera structure shown in Figure 2.

Figures 5 and 6 show two modified structures that may be used in mounting the optical exposure system onto the camera case.

Figure 7 is a sectional view taken substantially on the line 7—7 of Figure 2.

Figure 8 shows a modified structure for selectively adapting the camera for normal operation and for operation with a telephoto lens system.

Figure 9 is a sectional view taken substantially on the line 9—9 of Figure 8.

Figure 10 is an exploded perspective view of the camera shown in Figure 1.

Referring more particularly to Figure 1 the camera has a frame or case 10 in which are two film chambers 11, 12, each of which may be of conventional structure if desired. These two film chambers 11, 12 are light tight but have light entering apertures in registry with spaced apertures 13, 14 in the modified cylindrical structure 15 in which the optical exposure system 16 is journaled for rotation as a unit through an angle of substantially 90° for selective exposure through apertures 13, 14 of either film strip 17 in chamber 11 or the film strip 18 in chamber 12, the film strips 17, 18 being of different type or character and having their planes at right angles to one another when arranged for exposure. For example, strip 17 may be a 35 millimeter black and white film and strip 18 may be 35 millimeter color film, both of conventional manufacture.

The modified stationary cylindrical structure 15 has besides the two apertures 13, 14 a third aperture 19 intermediate apertures 13 and 14 and displaced forty-five degrees from each through which scenes may be projected onto the ground or acid etched glass screen 20. The glass screen 20 may have its edges suitably affixed to the housings 21, 22 enclosing chamber 13 and 14 respectively. The two apertures 13, 14 may be termed picture apertures and serve to allow correct exposure of film contained therein, while the third aperture 19 may be termed a focusing aperture.

The provision of this intermediate aperture 19 allows critical ground glass focusing, and since the ground glass screen 20 may be the same size as the film negative, it can also be used as a view finder. Further, since the planes of film 17, 18 and screen 20 are equidistant from the center of rotation of the optical exposure system 20, no parallax correction is needed. To aid in focusing, a small hinged conventional magnifier, if desired, may be mounted for cooperation with the ground glass screen 20. To aid in aligning the camera, a simple wire frame or other type of conventional view finder may be positioned for cooperation with the ground glass screen 20.

The optical exposure system 16, barrel shaped, is mounted for rotation within the modified cylinder structure 15. A considerable portion of this cylindrical structure 15 is removed to provide the previously mentioned apertures 13, 19, 14 displaced 45° from one another and additional material therefrom is removed to allow the cylindrical wall and the end walls of the barrel shaped exposure system 16 to be visible. In other words, the system 16 is mounted for rotation within the spaced annular ring portions 15A, 15B forming the remaining portion of the cylindrical member 15, each ring portion 15A, 15B having an L-shaped cross-section and a guide pin cooperatively engaging a guide slot 16A in the outer surface of the movable exposure system 16.

Also, one of the rings 15A, 15B may have a conventional type of spring pressed ball 15D cooperating with spaced detents 16B to comprise detent means whereby the system 16 may be automatically positioned for exposing film 17 or 18 or projecting a scene on the ground glass screen.

The optical exposure system 16 movable as a unit comprises: an outer cylindrical housing journalled as previously mentioned in the ring portions 15A, 15B within which extends a cylindrical light tube 25 with the axis of the cylindrical tube perpendicular to the axis of rotation of the system 16; an adjustably positioned telescopic wall member 26 within the light tube 25 which is movable upon manual rotation of the focusing ring 27, ring 27 extending through the end walls of the panel shaped system to allow convenient adjustment as shown in Figure 2 and being internally threaded for cooperation with the wall member pin 26A which is movable in the guide slot 24A and with lateral movement of the ring 27 being prevented by the pair of spaced annular stop 25C; a lens 22 and associated shutter 23 operable by the shutter release 24, all mounted as a unit in the internally threaded central aperture in movable wall 26; and a conical shaped filter holder 29 which may have a clear opening 29A therein as well as other suitable openings therein for holding either filter elements 29B, 29C in addition to a concave or negative type of lens 29D, the movable holder 29 being pivotally mounted on the light tube 25 as shown in Figure 7 and having a four toothed gear 30 thereon for cooperation with gear 31 which in turn is mounted on shaft 32 journalled for rotation on one end wall of the barrel shaped housing 16 and projecting therethrough with a control knob 33 whereby the filter holder 29 may be moved to any one of its four positions and maintained therein by conventional spring biased detent means (not shown) of the type shown in Figure 1.

Thus, the lens mount including the movable wall member 26 upon which lens 22 is mounted may be moved to produce proper focusing upon rotation of the ring 27 to thereby cause the lens mount to move towards or away from the film 17 or 18 as the case may be. Focusing is accomplished through that particular filter element, clear space or negative type of lens mount which is brought into position upon manual operation of the control knob 33.

Each film chamber 11, 12 is provided in conventional manner with film spool receiving means 35 for unexposed film, film take-up means 36 for the exposed film, and a film transport mechanism 37 including a toothed sprocket wheel operable by the manual control member 38, all in conventional manner. If desired, the film transport mechanism 37 may be constructed to include what is commonly called a film or exposure counter 40.

Each of the film chambers 11, 12 is provided with hinged back cover members 41, 42 respectively by which access may be had to the film chambers for inserting and removing film. Each cover 41, 42 has mounted thereon a leaf spring 43 fastened at a point intermediate its ends on the inside of each cover member 41, 42 for firmly pressing the focal plane film exposing frame 43A against the edges of the film and against the spaced film seats 44, 44A so that the film is presented in successive plane surfaces for projection thereon of light passing through the optical exposure system 16. This plane corresponds to the focal plane of the exposure system 16.

The concave or negative type of lens 29D mounted in the filter holder 29 may be positioned by control knob 33 to cooperate with the main lens 22 to form a telephoto system in which focusing again may be accomplished by manipulation of control ring 27. A telephoto system may also be produced in the arrangement shown in Figures 8 and 9 by positioning the concave or negative type of lens element 45 between the filter holder 29 and the lens mount including movable wall 26.

In the arrangement shown in Figures 8 and 9 the lens mount including the lens 22, shutter 23 and shutter release mechanism 24 is telescopically mounted in the movable wall member 26 which is in likewise manner as in Figure 1 moved into focusing position by manipulation of control ring 27. The movable lens mount may be held in either of one or two positions within the outer member 26 by detent means comprising a leaf spring 50 fastened on member 26 with its free end cooperatively engageable with the spaced detents 51, 52. When the spring 50 engages the detent 52 and the lens 45 is in the position shown in Figure 8, the camera is adapted for telephoto exposure. Thereafter, the camera may be adapted for conventional exposure using lens 22 only upon swinging lens 45 aside by the means described presently and by pushing the lens mount inwardly to a position wherein the leaf spring 50 engages detent 51 in which case precise focusing again may be obtained by manipulation of focusing ring 27.

The lens 45 may be mounted on one end of a lever member 55 which is pivoted at a point intermediate its ends on tube 25 with the other end of the lever 55 projecting through tube 25 barrel shaped housing 16 and the light tight seal 56 to thereby allow convenient manual manipulation of the lens 45 into and out of cooperating position with lens 22. Lever 55 may be held in operative and inoperative position for telephoto operation by spring biased detent means of the type shown in other places herein. In other respects corresponding parts in Figures 1 and 8 have identical reference numerals.

While I prefer the construction shown in Figures 1–4 and 7 for providing a light tight seal between the camera case 10 and the rotatably mounted optical exposure system 16, other constructions may be used. Such other constructions are exemplified in Figures 5 and 6. Figure 6 shows a cylindrical portion 15 of the case 10 having the picture apertures 13, 14 and focusing aperture 19 with spaced ears 60, 61 at the ends thereof, ears 60, 61 being provided with apertures 60A, 61A for journalling the barrel shaped exposure system 16 therein with an additional combination guide and stop slot 60B to guide and limit motion of the journalled optical system 16. Figure 5 shows the barrel shaped optical exposure system 16 provided with a flange 70 thereon cooperatively engaging the inner circular surface of the cylindrical member 15 comprising a portion of the case 10 and the inner surface of the flange member 72 fastened to member 15.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A camera having a film compartment, an optical exposure structure mounting a lens and a shutter for producing exposures, a conical shaped filter element having apertures therethrough arranged for movement between said compartment and said structure, filters mounted in said apertures, a telephoto lens mounted in one of said apertures for cooperation with the first mentioned lens to thereby allow the projection of magnified images into said film compartment.

2. A camera arrangement for the selective exposure of a plurality of film strips, said camera having separate film compartments for each of said strips and means therein whereby said strips move in substantially perpendicular planes therein, a single optical exposure structure mounting a lens and a shutter and adapted for selective movement for cooperation with a selected one of said compartments, means mounting said optical exposure structure for rotation on said camera about an axis perpendicular to the optical axis of said structure and parallel with said planes, and said film within said compartments, when in position for exposure, being substantially equidistant from the center of rotation of said structure, a conical shaped filter element having apertures therethrough arranged for movement between said selected one of said compartments and said structure, said conical shaped filter element being rotatably mounted on said optical exposure structure for joint movement therewith and having filter elements in said apertures, and a telephoto lens mounted in one of said apertures for cooperation with the lens of said exposure structure to thereby allow the projection of magnified images into said film compartment.

3. A camera arranged for the selective exposure of a plurality of separate film strips each disposed in separate film compartments, means whereby said film strips move in substantially mutually perpendicular planes, a single optical exposure structure mounting a lens and a shutter and adapted for selective movement for cooperation with a selected one of said compartments, means mounting said optical exposure structure for rotation on the frame of said camera about an axis extending substantially perpendicular to the optical axis of said structure and extending substantially parallel with said planes of said film strips, each of said film strips being substantially an equidistant distance from the center of rotation of said single optical exposure structure, said camera frame being apertured to provide a pair of picture apertures aligned with each of said film compartments, said camera frame having a third picture aperture therethrough intermediate said pair of picture apertures, said third picture aperture being aligned with a viewing screen also spaced said equidistant distance from the center of rotation of said optical exposure structure, said optical exposure structure having rotatably mounted thereon for joint movement therewith a conical filter element, said filter element having an adjustable shaft extending through said single optical exposure structure with the axis of said shaft extending generally perpendicular to the projection axis through the exposure structure, said conical shaped filter element having a plurality of apertures therein adapted to receive different optically transparent filters, and a telephoto lens mounted within one of said apertures.

WILLIAM D. THOMPSON.

REFERENCES CITED

The following references are of record in the file of this patent:

UNITED STATES PATENTS

| Number | Name | Date |
|---|---|---|
| 494,128 | Decker | Mar. 28, 1893 |
| 634,881 | Dallmeyer | Oct. 17, 1899 |
| 741,102 | Borsum | Oct. 13, 1903 |
| 896,013 | Hatt | Aug. 11, 1908 |
| 1,399,567 | Lehmann | Dec. 6, 1921 |
| 1,682,873 | Victor | Sept. 4, 1928 |
| 1,724,566 | Davidson | Aug. 13, 1929 |
| 2,245,606 | Rausch | June 17, 1941 |
| 2,273,430 | Bing | Feb. 17, 1942 |
| 2,315,284 | Thompson | Mar. 30, 1943 |
| 2,339,256 | Doncaster | Jan. 18, 1944 |
| 2,357,327 | Harris et al. | Sept. 5, 1944 |
| 2,384,655 | Stewart | Sept. 11, 1945 |
| 2,399,658 | Banker | May 7, 1946 |
| 2,482,571 | Arnold | Sept. 20, 1949 |

FOREIGN PATENTS

| Number | Country | Date |
|---|---|---|
| 24,520 | Great Britain | of 1903 |
| 656,624 | Germany | Feb. 12, 1938 |
| 658,467 | Germany | Apr. 8, 1938 |